(12) United States Patent
Dungworth et al.

(10) Patent No.: US 7,932,191 B2
(45) Date of Patent: Apr. 26, 2011

(54) PARTICULATE COMPOSITIONS AND THEIR MANUFACTURE

(75) Inventors: Howard Roger Dungworth, Brighouse (GB); Rachel Weston, Halifax (GB); Rebecca Kelly, Paris (FR)

(73) Assignee: Ciba Specialty Chemicals Water Treatments Ltd., West Yorkshire, Bradford (GB)

( * ) Notice: Subject to any disclaimer, the term of this patent is extended or adjusted under 35 U.S.C. 154(b) by 659 days.

(21) Appl. No.: 11/587,472

(22) PCT Filed: Apr. 18, 2005

(86) PCT No.: PCT/EP2005/004116
§ 371 (c)(1),
(2), (4) Date: Oct. 25, 2006

(87) PCT Pub. No.: WO2005/105291
PCT Pub. Date: Nov. 10, 2005

(65) Prior Publication Data
US 2007/0224899 A1   Sep. 27, 2007

(30) Foreign Application Priority Data
Apr. 29, 2004   (GB) .................................. 0409570.9

(51) Int. Cl.
  B32B 3/00 (2006.01)
  B32B 25/00 (2006.01)
  C08L 83/00 (2006.01)
  B05D 7/00 (2006.01)
(52) U.S. Cl. ....... 442/59; 428/402.2; 428/403; 523/201; 523/202; 427/212; 427/213.3
(58) Field of Classification Search ............. 428/402.24, 428/402.22, 403, 407, 307; 442/164, 59; 106/287.35; 264/47, 204, 4.33; 427/213.35
See application file for complete search history.

(56) References Cited

U.S. PATENT DOCUMENTS

| | | | |
|---|---|---|---|
| 3,912,792 A | 10/1975 | Touval | 260/863 |
| 4,105,823 A | 8/1978 | Hasler et al. | 428/307 |
| 4,861,539 A | 8/1989 | Allen et al. | 264/204 |
| 5,011,634 A | 4/1991 | Pietsch et al. | 264/47 |
| 5,081,166 A * | 1/1992 | Kiehlbauch et al. | 523/201 |
| 5,320,835 A | 6/1994 | Pahick et al. | 424/64 |
| 5,382,433 A | 1/1995 | Pahick et al. | 424/401 |
| 5,498,345 A | 3/1996 | Jollenbeck et al. | 252/589 |
| 5,508,025 A | 4/1996 | Hoshino et al. | 424/59 |
| 5,626,856 A | 5/1997 | Berndt | 424/401 |
| 5,728,760 A | 3/1998 | Rose et al. | 524/292 |
| 5,786,420 A * | 7/1998 | Grandhee | 525/7 |
| 6,024,943 A | 2/2000 | Ness et al. | 424/59 |
| 6,200,681 B1 | 3/2001 | Jahns et al. | 428/402.24 |
| 6,329,057 B1 * | 12/2001 | Dungworth et al. | 428/403 |
| 6,620,235 B1 | 9/2003 | Knowles et al. | 106/494 |
| 6,716,526 B2 * | 4/2004 | Weston et al. | 428/402.2 |
| 2003/0018102 A1 | 1/2003 | Weston et al. | 523/201 |

FOREIGN PATENT DOCUMENTS

| | | |
|---|---|---|
| AU | 27028/88 | 7/1989 |
| EP | 0 269 393 | 6/1988 |
| GB | 1 507 739 | 4/1978 |
| GB | 2 073 132 | 10/1981 |
| WO | 98/50002 | 11/1998 |
| WO | 99/24525 | 5/1999 |
| WO | 00/61689 | 10/2000 |
| WO | 01/54809 | 8/2001 |

OTHER PUBLICATIONS

Chem. Abstracts AN 2003:530224.

* cited by examiner

*Primary Examiner* — Angela Ortiz
*Assistant Examiner* — Altrev C Sykes
(74) *Attorney, Agent, or Firm* — Shiela A. Loggins

(57) ABSTRACT

A composition comprising particles which comprise a core material within a polymeric shell, wherein the core material comprises a hydrophobic substance, in which the amount of the polymeric shell forms at least 8% of the total weight of the particles, wherein the polymeric shell comprises a copolymer formed from a monomer blend which comprises, A) 5 to 90% by weight of an ethylenically unsaturated water soluble monomer, B) 5 to 90% by weight of a multifunctional monomer, and C) 0 to 55% by weight other monomer, and wherein the amount of the polymeric shell and the proportions of. A, B and C are such that the particles exhibit a half height of at least 350° C. The invention includes a process for the manufacture of particles and the use of particles in articles, such as fabrics, and coating compositions, especially for textiles.

34 Claims, No Drawings

PARTICULATE COMPOSITIONS AND THEIR MANUFACTURE

This invention relates to particulate compositions comprising particles having a core of hydrophobic material within a shell of polymeric material and a process of producing said compositions. The invention relates to articles comprising said particles and also relates to coating compositions containing the particles, coated articles, in particular coated fabrics and a process for obtaining them. In the invention the core may comprise an active ingredient such as ultra violet (UV) absorbers, flame retardants or phase change substances. Desirably the particulate compositions can easily be incorporated into a variety of products such as coatings, sun-screens or a variety of textile products.

There are many instances where it would be desirable to provide capsules comprising a shell surrounding a core material. For instance, the core may comprise an active ingredient which is released slowly, such as fragrances, pesticides, medicaments and the like. In other instances it may be desirable for the core material encapsulated within the shell to remain substantially intact either permanently or at least until a suitable trigger induces the core to be released. There are instances where it is important that the core material is not released from the capsules. This includes, for example, encapsulated ultra violet light absorbers for use in sunscreens and articles of clothing.

Another important application includes encapsulated phase change materials which can be used as thermal energy storage products. Such products include fabrics and especially clothing. Particles comprising encapsulated phase change hydrocarbon material may be applied to fabrics or incorporated into fibres forming the fabrics. One way of incorporating such particulate capsules into fabrics is by combining the capsules into a fibre spinning dope, in which is then extruded to form filaments which are cured and then collected. Since the spinning process normally requires passing the extruded dope into an environment at temperatures often in excess of say 150 or 200° C. and can be even as high as 350° C. or higher, it is desirable for substantially all of the core material to be retained in the shell. Fibres such as nylon and polyester fibres are produced by melt spun process, which generally involves very high temperatures, for instance in excess of 300 or 350° C. However, it is difficult to find the right chemistry that provides an impervious, durable shell wall that can be incorporated into fibres, without suffering deleterious effects during the spinning process.

WO-A-01/54809 provides capsules which can easily be incorporated into fibres without suffering the loss of an active core material during the spinning process. The capsules contain a polymeric shell which is formed from a monomer blend comprising A) 30 to 90% by weight methacrylic acid, B) 10 to 70% by weight alkyl ester of (meth)acrylic acid which is capable of forming a homopolymer of glass transition temperature in excess of 60° C. and C) 0 to 40% by weight other ethylenically unsaturated monomer.

It would be desirable to apply capsules containing phase change materials or other active ingredient such as UV absorbers to the surface of fabrics. This may be achieved by including the capsules in a coating composition, and coating the fabric and drying to form a coated fabric. However, the coating process and post-treatment of the fabric often involves subjecting coated fabric to very high temperatures and pressures, for instance where coated fabric is subjected to calendaring. Typically coated fabric and capsules held in the coating may be exposed to temperatures in excess of 300° C. or 350° C. and to pressures in excess of 200 psi. Therefore, it is not only essential that the capsules shells remain impervious to core material, but that the capsules shells are sufficiently strong to withstand the high pressures, especially when simultaneously exposed to high temperatures. If capsules shell walls are too weak, the shells will rupture and the core material would be released.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid. Variations of this type of process are described in GB-A-2073132, AU-A-27028/88 and GB-A-1507739, in which the capsules are preferably used to provide encapsulated inks for use in pressure sensitive carbonless copy paper.

However, although capsules based on melamine formaldehyde resins are both impervious and durable, they tend to suffer the disadvantage that they are less impermeable at elevated temperatures. In addition, there is also a risk that formaldehyde is evolved WO-A-9924525 describes microcapsules containing as a core a lipophilic latent heat storage material with a phase transition at −20 to 120° C. The capsules are formed by polymerizing 30 to 100 wt. % C1-24 alkyl ester of (meth)acrylic acid, up to 80 weight % of a di- or multifunctional monomer and up to 40 weight % of other monomers. The microcapsules are said to be used in mineral molded articles. However, the specific polymer compositions described would not be suitable for exposure to high temperatures since the lipophilic phase change material would be very quickly lost. Furthermore, none of the specific polymer compositions are sufficiently strong to withstand high pressures.

There exists a need for particles that comprise a substantially impervious shell wall that retains a hydrophobic material under conditions of high pressures (generally in excess of 200 psi), especially at elevated temperatures. It would be desirable to provide particles that do not release the hydrophobic core material during the harsh conditions of coating fabrics and after treatment of the coated fabrics.

There is also a particular need to provide alternative particles that do not release the core material even when exposed to the harsh conditions, for instance high temperatures during spinning of fibres.

There also exists a need for particles that do not release the core material until there has been a suitable release trigger, for instance pH. Nevertheless, the core material would not be released in the absence of the trigger.

There is also a need to achieve all of these objectives but avoiding the use of formaldehyde condensation products.

Thus according to the present invention we provide a composition comprising particles which comprise a core material within a polymeric shell, wherein the core material comprises a hydrophobic substance, in which the amount of the polymeric shell forms at least 8% of the total weight of the particles, wherein the polymeric shell comprises a copolymer formed from a monomer blend which comprises, A) 5 to 90% by weight of an ethylenically unsaturated water soluble monomer,
B) 5 to 90% by weight of a multifunctional monomer, and
C) 0 to 55% by weight other monomer, and wherein the amount of the polymeric shell and the proportions of A, B and C are such that the particles exhibit a half height of at least 350° C.

Also included in the present invention is a process of manufacturing a composition comprising particles which comprise a core material within a polymeric shell, wherein the core material comprises a hydrophobic substance, comprising the steps,
1) forming a solution of monomer in a hydrophobic liquid,
2) homogenizing the monomer solution into an aqueous phase to form an emulsion,
3) subjecting the emulsion to polymerization conditions, and
4) forming a dispersion of polymeric particles in the aqueous phase,
in which the amount of the polymeric shell forms at least 8% of the total weight of the particles,
wherein the polymeric shell comprises a copolymer formed from a monomer blend which comprises,
  A) 5 to 90% by weight of an ethylenically unsaturated water soluble monomer,
  B) 5 to 90% by weight of a multifunctional monomer, and
  C) 0 to 55% by weight other monomer,
and wherein the amount of the polymeric shell and the proportions of A, B and C are such that the particles exhibit a half height of at least 350° C.

The process may employ an emulsifying system, for instance emulsifiers, other surfactants and/or polymerization stabilizers. Thus in a preferred form of the invention an emulsifier, which may have a high HLB is dissolved into water prior to emulsification of the monomer solution. Alternatively the monomer solution may be emulsified into water with a polymerization stabilizer dissolved therein. The polymerization stabilizer can be a hydrophilic polymer, for example a polymer containing pendant hydroxyl groups, for instance a polyvinyl alcohol and hydroxyethylcellulose. Generally it is preferred to use polyvinyl alcohol. The polyvinyl alcohol stabiliser may be derived from polyvinyl acetate, and preferably between 85 and 95%, especially 90% of the vinyl acetate groups are hydrolyzed to vinyl alcohol units.

The polymerization step may be effected by subjecting the aqueous monomer solution to any conventional polymerization conditions. Typically, the monomer is subjected to free radical polymerization. Generally polymerization is effected by the use of suitable initiator compounds. Desirably this may be achieved by the use of redox initiators and/or thermal initiators. Typically redox initiators include a reducing agent such as sodium sulphite, sulphur dioxide and an oxidizing compound such as ammonium persulphate or a suitable peroxy compound, such as tertiary butyl hydroperoxide etc. Redox initiation may employ up to 1000 ppm, typically in the range 1 to 100 ppm, normally in the range 4 to 50 ppm.

Preferably the polymerization step is effected by employing a thermal initiator alone or in combination with other initiator systems, for instance redox initiators. Thermal initiators would include any suitable initiator compound that releases radicals at an elevated temperature, for instance azo compounds, such as azobisisobutyronitrile (AZDN), 4,4'-azobis-(4-cyanovalereic acid) (ACVA) or t-butyl perpivilate. Typically thermal initiators are used in an amount of up 50,000 ppm, based on weight of monomer. In most cases, however, thermal initiators are used in the range 5,000 to 15,000 ppm, preferably around 10,000 ppm. Preferably a suitable thermal initiator is combined with the monomer prior to emulsification and polymerization is effected by heating the emulsion to a suitable temperature, for instance at least 50 or 60° C. or higher for sufficient time to effect polymerization. More preferably, the process is effected in by maintaining the emulsion at a temperature of between 50 and 80° C. for a period of between 90 and 150 minutes. In such cases it may be desirable to subsequently subject the emulsion to a temperature of at least 80° C. for a period of at least 30 minutes, for instance up to 90 minutes.

We have discovered that polymers formed from the special combination of a monomer blend which comprises,
  A) 5 to 90% by weight of an ethylenically unsaturated water soluble monomer,
  B) 5 to 90% by weight of a multifunctional monomer, and
  C) 0 to 55% by weight other monomer,
in which the amount of the polymeric shell forms at least 8% of the total weight of the particles such that the amount of the polymeric shell and the proportions of A, B and C the particles exhibit a half height of at least 350° C. exhibit considerably improved performance in regard to the strength of the capsules and impermeability to the core material, especially at elevated temperatures. The capsules of the present invention have been shown to exhibit superior strength and retain significantly more hydrophobic material than other capsules not having the defined parameters.

The half height value of the capsule is measured by thermo gravimetric analysis, by applying heat to the dry capsules at a rate of 20° C./min and measuring the weight loss. The half height value is the temperature at which half the weight of the capsule is lost. Unexpectedly we have found that capsules with half heights at least 350° C. will survive the high pressures and temperatures involved in calendering and thermo cycling in a coating application in stark contrast to weak capsules (typically those with half heights<350° C.).

The composition of the present invention may comprise particles in which the average particle size diameter is less than 100 microns. Generally the average particle size diameter tends to be much smaller, often less than 50 microns and typically the average particle diameter will be between 200 nm and 40 microns. Preferably the average particle size diameter is in the range 500 nm and 30 microns, particularly between 1 and 20 microns, especially 1 to 2 microns. Average particle size is determined by a Coulter particle size analyzer according to standard procedures well documented in the literature.

In addition to the special combinations of water soluble ethylenically unsaturated monomer with multifunctional monomer and optionally other monomer and a half height of at least 350° C., it is also essential for the polymeric shell to form at least 8% of the total weight of the particles. If the polymeric shell forms less than 8%, the strength of the capsule is significantly impaired. Preferably in the polymeric shell forms a greater proportion of the total weight of particle. The amount of polymeric shell may be as much as 50% or more although it is preferred that the shell forms between 10 and 50% of the total weight of the particles. Normally, it would be unnecessary for the proportion of polymeric shell to be significantly higher than 50% in order to achieve the optimum strength characteristics and in addition this could impair the activity of the core material. In order to achieve optimum strength of the capsule it is particularly preferred that the shell forms between 10 and 20% of total weight particles, in particular 12.5 to 15%.

The water-soluble ethylenically unsaturated monomer component A desirably has a solubility in water of at least 5 g/100 cc at 25° C. Preferably it is at least partially soluble in or at least miscible with the hydrocarbon substance of the core. It may be a non-ionic monomer, such as acrylamide, methacrylamide, hydroxy ethyl acrylate or N-vinyl pyrrolidone. Preferably though, the water-soluble monomer is ionic.

Desirably the ionic water-soluble monomer is an anionic monomer, and desirably contains a suitable acid moiety, for instance carboxylic acid or sulfonic acid. Preferably the anionic monomer is selected from the group consisting of acrylic acid, methacrylic acid, itaconic acid, maleic acid, vinyl sulfonic acid, allyl sulfonic acid and 2-acrylamido-2-methylpropane sulfonic acid, in the form of the free acid or water soluble salts thereof. Methacrylic acid is a particularly preferred anionic monomer.

The ionic water-soluble monomer may also be a cationic monomer, having a suitable cationic functionality such as a quaternary ammonium group or a potentially cationic such as a tertiary amine group which can be ionised at low pH. Preferably the cationic monomer is selected from the group consisting of dialkyl amino alkyl acrylates, dialkyl amino alkyl methacrylates, dialkyl amino alkyl acrylamides, dialkyl amino alkyl methacrylamides and diallyl dialkyl ammonium halides, in the form of acid salts or quaternary ammonium salts. Particularly suitable cationic monomers include diallyl dimethyl ammonium chloride and the methyl chloride quaternary ammonium salts of dimethyl amino ethyl acrylate, dimethyl amino ethyl methacrylate, t-butylaminoethyl methacrylate, dimethyl amino propyl acrylamide, dimethyl amino propyl methacrylamide.

The multifunctional monomer, component B, should readily react with the water-soluble monomer to provide a cross linked structure. Desirably the multifunctional monomer contains at least two ethylenically unsaturated groups or alternatively may contain one ethylenically unsaturated group and one reactive group capable of reacting with other functional groups in any of the monomer components. Preferably, the multifunctional monomer is insoluble in water or at least has a low water-solubility, for instance below 5 g/100 cc at 25° C., but usually less than 2 or 1 g/100 cc. In addition the multifunctional monomer should be soluble or at least miscible with the hydrocarbon substance of the core material. Suitable multifunctional monomers include divinyl benzene, ethoxylated bisphenol A diacrylate, propoxylated neopentyl glycol diacrylate, tris(2-hydroxyethyl) isocyanurate triacrylate, trimethylolpropane triacrylate and an alkane diol diacrylate, for instance 1,3-butylene glycol diacrylate, 1,6-hexanediol diacrylate but preferably 1,4-butanediol diacrylate.

The monomer blend used to form the polymeric shell may also include up to 55% by weight other monomer (component C). In this monomer may be any suitable ethylenically unsaturated monomer that will readily copolymerising with the water-soluble monomer (component A) and the multifunctional monomer (component B). Preferably, the other monomer is insoluble in water or at least has a low water-solubility, for instance below 5 g/100 cc at 25° C., but usually less than 2 or 1 g/100 cc. In addition the other monomer should preferably be soluble or at least miscible with the hydrocarbon substance of the core material. Particularly suitable monomers for use as component C include monomers selected from the group consisting of $C_{1-30}$ alkyl esters of ethylenically unsaturated carboxylic acid, styrene, vinyl acetate, acrylonitrile, vinyl chloride and vinylidene chloride. Particularly suitable monomers are $C_{1-8}$ alkyl esters of acrylic or methacrylic acid, preferably methyl methacrylate.

In general in the process of preparing particles the monomer blend is combined with the hydrophobic substance and emulsified into an aqueous medium and therefore forming a dispersed hydrophobic phase (preferably organic) in a continuous aqueous phase. Preferably the multifunctional monomer (component B) and, where included, the other monomer (component C) will preferentially partition into the dispersed hydrophobic phase while the water-soluble monomer may exist both in the dispersed organic phase and also the aqueous continuous phase. Without being limited by theory, it is believed that the combination of hydrophobic monomer in the dispersed hydrophobic phase and water-soluble monomer in the continuous phase the shell wall to be constructed from both inside and outside the dispersed phase.

Preferably the monomer blend comprises a copolymer formed from a monomer blend which comprises, 10 to 75% by weight of component A, 10 to 75% by weight of component B, and 10 to 50% by weight of component C. More preferably, the monomer blend comprises 20 to 70%, especially 40 or 45 to 60% by weight component A, 20 to 70%, especially 40 to 60% by weight component B and 10 or 15 to 20% by weight of component C. A particularly suitable copolymer is formed from a monomer blend in which comprises 10 to 75% by weight (preferably 20 to 70%, especially 40 to 60%) of methacrylic acid, 10 to 75% (preferably 20 to 70%, especially 40 to 60%) by weight of butane diol diacrylate, and 10 to 50% (preferably 10 or 15 to 20%) by weight of methyl methacrylate.

The composition of the present invention provides a particulate composition comprising core material within a polymeric shell, wherein the core material comprises a hydrophobic substance polymeric material. Desirably a substantial proportion of the core consists of the hydrophobic substance. Other materials may be included in the core, for instance additives which modify the properties of the hydrophobic substance. The other materials present in the core material may be hydrophilic and suspended in the hydrophobic substance, for instance inorganic salt hydrates. Alternatively the other additives may be polymeric additives which are miscible or soluble in the hydrophobic substance. Generally where included in the core these other materials will form no more than 10% by weight of the total core material. Often the other materials form less than 5% of the core normally less than 2%, for instance 0.5 to 1.5%. Thus the core will generally comprise at least 90% of the hydrophobic substance. Preferably the amount of hydrophobic substance comprised in the core will be more than 95% by weight, more preferably more than 98%, in particular 98.5 to 99.5%.

The core material may comprise an active ingredient selected from the group consisting of UV absorbers, UV reflectors, flame retardants, active dye tracer materials, pigments, dyes, colorants, enzymes, detergent builders and fragrances. Generally within the context of the present invention it would be unnecessary for the active ingredient to be released. For instance encapsulated pigments may be used in pigmented articles, such as ceramics, where it would be important for the pigment not to be released. There is also an application for encapsulated colorants, i.e. dyes and pigments for many other applications, for instance in preparing textile products. Thus the particles comprising a pigment or dye can be incorporated into or adhered to a fibre or textile article. The color would be held by the particle and there would be no risk of color leaching.

Alternatively the encapsulated colorant may be applied to packaging materials, for instance food packaging. Thus shaded paper or board used in food packaging may be prepared by including the encapsulated pigments or dyes into the paper making process. Typically the colorants can be C.I. Pigment Violet 19, C.I. Pigment Blue 15, C.I. Pigment Blue 60, C.I. Pigment Red 177 as described in WO-A-00/61689

Alternative applications of encapsulated pigments includes cosmetics, for instance as described in U.S. Pat. Nos. 5,382,433, 5,320,835 or WO-A-98/50002. Typically the colorants can be mica, talc, D&C Red 7 Calcium Lake, D&C Red 6 Barium Lake, Iron Oxide Red, Iron Oxide Yellow, D&C Red 6 Barfum Lake, Timiron MP-1001, Mineral (Carnation White), Helindon Pink, Red 218, Japan Blue No. 1 Al lake, Polysiloxane-treated Titanium mica.

In a further aspect of the invention we provide particles which do not release the core material and/or active ingredient until a suitable trigger mechanism has occurred. In this case the trigger is an increase in pH to above pH 10.

Thus such alkali releasable particles may be applied in a variety of applications where the use of high pH may be used as a release mechanism. In one application the active ingredient may be for instance a lipophilic compound that is soluble in refined or crude oil, and examples of oil containing environments into which it is to be released include downhole and pipeline. Desirably such lipophilic compounds are selected from wax deposition inhibitors, pour point depressants, demulsifiers, scale inhibitors corrosion inhibitors, biocides, enzymes, surfactants, antioxidants. The particles will desirably release the active ingredient upon increasing the pH to above pH 10. Thus the particles may be injected into a subterranean reservoir under neutral of acid conditions. The capsules may release the active ingredient upon subsequent injection of aqueous alkali, for example as part of an alkali flooding process.

The active ingredient may also be a substance that is to be released in to an aqueous environment. This may be recirculating water such as in cooling water systems, which are normally operated under alkali conditions. Suitable actives for release into aqueous systems include antiscalents, corrosion inhibitors, biocides, dispersants, and antioxidants.

Generally the hydrophobic substance comprised in the core may be an organic material. For instance the hydrophobic substance may be a hydrocarbon such as an oil or a wax. Preferably the hydrophobic substance is a non-polymeric material. The oil or wax may contain active materials, such as UV absorbers, UV reflectors, or flame retardants dispersed or dissolved therein. Thus the core material may a homogenous or alternatively may comprise a dispersion of solid active material dispersed throughout a continuous core medium of hydrophobic substance. When the core material comprises a phase change material, generally the phase change material is an oil or a wax which is liquid at a temperature between −30° C. and 150° C.

Typical examples of flame retardants suitable for the present invention include bromobenzoates as described in U.S. Pat. No. 5,728,760 and halogenated phosphates, thiophosphates orthiophosphoryl chlorides as given in U.S. Pat. No. 3,912,792.

Suitable ultra violet light absorbers of the present invention include naphthalene-methylenemalonic diesters, for instance as mentioned in U.S. Pat. No. 5,508,025 or compositions comprising mixtures of benzotriazoles and 2-hydroxy benzophenones as claimed by U.S. Pat. No. 5,498,345.

When the core material is a phase change substance it may be for instance any known hydrocarbon that melts at a temperature of between −30 and 150° C. Generally the substance is a wax or an oil and preferably has a melting point at between 20 and 80° C., often around 30° C. Desirably the phase change substance may be a C8-40 alkane or may be a cycloalkane. Suitable phase change materials includes all isomers of the alkanes or cycloalkanes. In addition it may also be desirably to use mixtures of these alkanes or cycloalkanes. The phase change material may be for instance any of the compounds selected from n-octadecane, n-tetradecane, n-pentadecance, n-heptadecane, n-octadecane, n-nonadecane, n-docosane, n-tricosane, n-pentacosane, n-hexacosane, cyclohexane, cyclooctane, cyclodecane and also isomers and/or mixtures thereof.

In a preferred form of the invention the core consists essentially of a hydrophobic substance, for instance at least 90%, which is a non-polymeric material, preferably a hydrocarbon, for instance an oil or wax, in particular a phase change material. Although the preferred hydrophobic substance is a phase change material which is essentially non-polymeric, it is within the scope of the present invention for a smaller amounts of polymeric additives to be included within the phase change non-polymeric material. Usually this will be in amounts of less than 10% by total weight of core and often will be less than 5, for instance 0.5 to 1.5 or 2% by weight. A particularly desirable polymeric additive is a substance that will modify the properties of the phase change material. For instance it is known that the temperature at which a phase change material melts on absorbing heat can be significantly different from the temperature at which it solidifies when losing heat. Thus a particularly desirable polymeric additive would be a substance which will bring the melting and solidifying temperatures closer together. This minimization of the shift in melting/freezing point of the phase change material may be important in various domestic applications or for garments.

Alternatively the phase change material comprised in the core could be a substance other than a hydrocarbon. The phase change material could be an inorganic substance that absorbs and desorbs latent heat during a liquefying and solidifying phase transition. The inorganic substance may be a compound which releases or absorbs heat during a dissolving/crystallization transition. Such inorganic compounds include for instance sodium sulphate decahydrate or calcium chloride hexahydrate. Thus the inorganic phase change material may be any inorganic substance that can absorb or desorb thermal energy during a transition at a particular temperature. The inorganic phase change material may be in the form of finely dispersed crystals which are dispersed throughout the core matrix which comprises a hydrophobic substance. In one form the inorganic phase change material is dispersed throughout a solid hydrophobic substance such as a wax. Alternatively the hydrophobic substance comprised in the core remains substantially liquid and contains crystals of the inorganic phase change material dispersed throughout the liquid. Preferably the hydrophobic liquid is a hydrocarbon. During a phase change the crystals become liquid droplets dispersed throughout the liquid. It may be advantageous to include a suitable surfactant, such as a water in oil emulsifier into the hydrophobic liquid in order to prevent coalescence of the dispersed droplets of liquid. Preferably the inorganic phase change material is dispersed throughout a matrix of hydrocarbon phase change material which is a wax or an oil. In this preferred embodiment the hydrocarbon and inorganic materials may both absorb or desorb heat. Alternatively the hydrocarbon phase may be a carrier oil that is not necessarily a phase change material. In this instance the carrier oil may be a process aid.

It is possible to incorporate the particles of the present invention into any suitable article, for instance fibres, textile products, ceramics, coatings etc. Thus in a further aspect of the present invention we provide an article comprising a particulate composition comprising a polymeric shell, in which the core material comprises a hydrophobic substance, in which the amount of the polymeric shell forms at least 8% of the total weight of the particles, wherein the polymeric shell comprises a copolymer formed from a monomer blend which comprises,
    A) 5 to 90% by weight of an ethylenically unsaturated water soluble monomer,
    B) 5 to 90% by weight of a multifunctional monomer, and
    C) 0 to 55% by weight other monomer,
and wherein the amount of the polymeric shell and the proportions of A, B and C are such that the particles exhibit a half height of at least 350° C. Desirably the particulate composition includes any of the aforementioned preferred features.

The article may be a textile product or a paper or board packaging material or a shaped mineral article. Furthermore, it is possible to provide an article which comprises encapsulated flame retardants, UV absorbers, active dye tracer materials or phase change material. In the case of encapsulated flame retardants it would be desirable for the flame retardant to be retained during any processing steps such as fibre formation, involving temperatures of for instance, between 150° C. to about 350° C. but then released when exposed to the excessive temperatures in excess of say above 400 or 500° C. In a preferred embodiment of the invention the polymer particles comprise a core material that contains both a phase change material, which is a wax or an oil and dispersed or dissolved therein a flame retarding substance. Thus in one preferred form of the invention the presence of the flame retardant in the capsule would prevent or reduce the risk of phase change material from igniting if released under excessive temperatures.

In a further aspect of the present invention we provide a coating composition comprising a particulate composition which comprises a core material within a polymeric shell, wherein the core material comprises a hydrophobic substance, in which the amount of the polymeric shell forms at least 8% of the total weight of the particles,
wherein the polymeric shell comprises a copolymer formed from a monomer blend which comprises,
    A) 5 to 90% by weight of an ethylenically unsaturated water soluble monomer,
    B) 5 to 90% by weight of a multifunctional monomer, and
    C) 0 to 55% by weight other monomer,
and wherein the amount of the polymeric shell and the proportions of A, B and C are such that the particles exhibit a half height of at least 350° C. Desirably the particulate composition includes any of the aforementioned preferred features.

The coating composition may be used for any suitable substrate, such as paper, wood, metal, plastics, ceramics and the like. Preferably the composition is for coating a textile and can for instance be a polyurethane or polyacrylic textile coating composition. Typically, the coating composition of the present invention is prepared by combining the particulate composition of the present invention with a conventional coating composition (e.g. acrylic or polyurethane textile coating composition) which comprises conventional ingredients used in conventional amounts. The coating composition is a formulation which is desirably prepared by mixing between 30 and 90% by weight of the dry particulate capsules of the present invention and between 10 and 70% by weight of a conventional polyurethane or polyacrylic textile coating composition. Preferably the coating formulation comprises between 60 and 80% by weight dry capsules and between 20 and 40% by weight of the conventional polyurethane or polyacrylic textile coating composition. A particularly preferred coating formulation is prepared containing 70% of the dry capsule and 30% of a polyurethane or polyacrylic textile coating.

We also provide a process of coating a fabric comprising the steps of
  i) providing a textile coating composition,
  ii) applying the coating composition to a surface of the fabric, and
  iii) drying the coating to provide a coated fabric,
in which the coating composition comprises a particulate composition which comprises a core material within a polymeric shell, wherein the core material comprises a hydrophobic substance,
in which the amount of the polymeric shell forms at least 8% of the total weight of the particles,
wherein the polymeric shell comprises a copolymer formed from a monomer blend which comprises,
    A) 5 to 90% by weight of an ethylenically unsaturated water soluble monomer,
    B) 5 to 90% by weight of a multifunctional monomer, and
    C) 0 to 55% by weight other monomer,
and wherein the amount of the polymeric shell and the proportions of A, B and C are such that the particles exhibit a half height of at least 350° C.

Typically the composition comprising the dry capsules of the invention and conventional textile coating, for instance as described above, is prepared and where required stirred for sufficient time to distribute the particles throughout the coating composition, for example 10 minutes, and then substantially immediately coated onto the fabric. The fabric may be a woven fabric or alternatively can be a non-woven fabric. Usually the coating applied to the fabric would be at least 50 g/m$^2$ and may be as much as 180 g/m$^2$. Generally a coat weight of 80 to 120 gm$^2$, especially around 100 gm$^2$ is usually desired. Typically in the laboratory, the coating can be applied using many different well known techniques used in industry. The coating can be applied using a k-bar. The coated fabric can then be dried in a suitable drying apparatus, for instance at a temperature of between 100° C. and 200° C. for up to 10 minutes to dry and cure the coating. Generally the coated fabric may be calendared using in excess of 200 psi (e.g. 250 psi) pressure In order to demonstrate that the active material is retained within the capsules in the coated fabric, capsules can be incorporated into a textile coating formulation, coated on to fabric and then calendared using in excess of 200 psi (e.g. 250 psi) pressure then subjected to continuous heating and cooling (thermocycling) above and below the melting temperature of the wax, and for instance for octadecane this can be from 10° C. to 60° C. for 50 times. The coated fabric can then be washed using a hydrocarbon solvent e.g. hexane and the enthalpy of the coated capsules is measured using Differential Scanning Calorimetry. This is compared to the enthalpy of the original coated capsules before calendaring and continuous heating and cooling has taken place.

Further articles according to the invention include fibres and fabrics formed from said fibres, wherein the fibres comprise particles of the present invention composition each comprising core material within a polymeric shell, wherein the core material comprises a hydrophobic substance Thus we provide a fibre containing particles comprising a core material within a polymeric shell, wherein the core material comprises a hydrophobic substance,
in which the amount of the polymeric shell forms at least 8% of the total weight of the particles,
wherein the polymeric shell comprises a copolymer formed from a monomer blend which comprises,
    A) 5 to 90% by weight of an ethylenically unsaturated water soluble monomer,
    B) 5 to 90% by weight of a multifunctional monomer, and
    C) 0 to 55% by weight other monomer,
and wherein the amount of the polymeric shell and the proportions of A, B and C are such that the particles exhibit a half height of at least 350° C. Desirably the particulate composition includes any of the aforementioned preferred features.

In this aspect of the invention the fibres comprise said particles distributed within the matrix of the fibre. Generally the diameters of the particles should be less than half of the cross-sectional diameter of the fibre. Generally, if the particles are much larger there is a risk that the presence of such large particles in the fibres could result in the fibres which tend to break at the position of the particle. Typically the particles will have a particle size diameter less than 30%, preferably less than 10% of the diameter of the fibre.

The fibres comprising the particles of the present invention can be made by incorporating the particles into the spinning dope. The spinning dope can then be spun according to standard spinning techniques, for instance as described in EP-A-269393. Generally the spinning dope is then passed through an orifice into a heated atmosphere where the extruded dope is cured to form a fibre, which is then collected.

The particles comprised in the composition of the present invention are suitable for incorporating into any fibres, for instance acrylics, polyesters, nylon, polypropylene.

According to this aspect of the invention we provide a process of forming a fibre containing particles comprising a core material within a polymeric shell in which the core material comprises a hydrophobic substance comprising the steps of,
1) combining said particles with a liquid spinning dope,
2) extruding the spinning dope,
3) passing extruded dope through an atmosphere at a temperature of at least 150° C. and
4) collecting formed fibres,
in which the amount of the polymeric shell forms at least 8% of the total weight of the particles,
wherein the polymeric shell comprises a copolymer formed from a monomer blend which comprises,
 A) 5 to 90% by weight of an ethylenically unsaturated water soluble monomer,
 B) 5 to 90% by weight of a multifunctional monomer, and
 C) 0 to 55% by weight other monomer,
and wherein the amount of the polymeric shell and the proportions of A, B and C are such that the particles exhibit a half height of at least 350° C.

Desirably the polymeric particles are sufficiently impermeable to the hydrophobic substance contained in the core so that during the formation of the fibre the high temperature conditions do not result in any significant loss of the hydrophobic substance. We have surprisingly found that the core material is able to retain most or all of the core material even when the polymeric particles are exposed to a spinning temperature in excess of 150° C. This has also been found to be the case even when the spinning temperature is much higher, for instance in excess of 200° C. Thus we find that the particles retain at least 98% by weight, preferably 99%, of the hydrophobic substance when passed though the spinning process.

A particularly important application of the present invention relates to incorporation of particles in fibres, which particles contain a phase change substance as the core material. The durability and impermeability of the polymeric shell towards the phase change material enables the particles to be incorporated into fibres without any significant loss of the phase change material. The impregnated fibres containing phase change material can then be woven into textile products. The textile products can include items of clothing and other fabrics.

The following examples demonstrate invention.

EXAMPLE 1

Typical Example of Capsule Preparation

An oil phase was prepared by mixing together 27 g methacrylic acid, 24 g butane diol diacrylate and 9 g methyl methacrylate with 140 g octadecane and 0.5 g tertiary butyl perpivalate (thermal initiator). The oil phase was homogenised into water containing 6 g polyvinyl alcohol using a silverson mixer until a stable emulsion was formed. The emulsion was then transferred into a reactor with a stirrer and thermometer. The content of the reactor was then heated to 60° C. and maintained at this temperature for 2 hours after which the contents are heated to 80° C. and maintained at this temperature for a further hour before cooling. The resulting emulsion contained polymeric particles each comprising a polymeric shell encapsulating the octacdecane wax having a solids content of 45% and particle size of 1.5 microns.

EXAMPLE 2

Capsule Preparation (Sample 1)

| Water Phase | |
|---|---|
| 190.0 g | of water |
| 60.7 g | of a 10% strength aqueous solution of polyvinyl alcohol (88% hydrolysed, average molecular weight 120,000) |
| 0.7 g | of a 50% aqueous solution of 2-acrylamido-2-methylpropane sulphonic acid Na salt |
| Oil Phase | |
| 171.3 g | of Octadecane |
| 11.0 g | of methacrylic acid |
| 9.8 g | of butanediol diacrylate |
| 3.7 g | of methyl methacrylate |
| 0.2 g | of lauroyl peroxide |

The two phases were dispersed using a high-speed mixer. After 5 minutes of dispersing, a stable, oil in water emulsion with a particle size of approximately 2 μm was obtained. The emulsion was degassed with nitrogen and heated to 75° C. while stirring with an anchor stirrer. Polymerisation was allowed to take place over 1 hour after which 2.4 g of an 5% aqueous solution of ammonium persulphate was added and the contents held for a further 1 hour at 85° C. The composition was then cooled and the resulting microcapsule dispersion had a solids content of 45.0% and an average particle size of 1.63 μm and Brookfield viscosity (spindle 3, 20 rpm) of 250 cPs. The TGA half height was measured at 376° C.

EXAMPLE 3

Effect of Wall Level on Capsule Strength

Example 2 was repeated using a monomer blend of 45/40/15 methacrylic acid/butane diol diacrylate/methyl methacrylate (MAA/BDDA/MMA) having various amounts of wall. TGA Half height is determined in each case and is measured by thermo gravimetric analysis, by applying heat to the dry capsules at a rate of 20° C./min and measuring the weight loss. The half height value is the temperature at which half the weight of the capsule is lost.

The ability for the capsules to retain the wax after subjecting to heat and pressure was determined by the following method. The capsules are incorporated into a textile coating formulation and coated on to fabric. The fabric is calendared using 250 psi pressure then subjected to continuous heating and cooling (thermocycling) from 10° C. to 60° C. for 50 times. The coated fabric is then washed using a hydrocarbon solvent and the enthalpy of the coated capsules is measured using Differential Scanning Calorimetry. This is compared to the enthalpy of the original coated capsules before calendaring and continuous heating and cooling has taken place. The capsules should retain at least half of the wax The half height and wax loss results are shown in Table 1.

TABLE 1

| Sample Number | % Wall | Half Height C | Wax Loss % |
|---|---|---|---|
| 2 | 2 | 226 | |
| 3 | 4 | 284 | |
| 4 | 6 | 319 | 70 |
| 5 | 8 | 350 | 46 |
| 6 | 10 | 408 | 28 |
| 7 | 12.5 | 388 | |
| 8 | 15 | 385 | |
| 9 | 20 | 380 | 0 |
| 10 | 30 | 377 | 0 |
| 11 | 40 | 369 | 3 |
| 12 | 50 | 370 | 0 |

These results show that a wall level of at least 8% is required to attain strong capsules.

EXAMPLE 4

Example 2 was repeated but varying the monomer blend to demonstrate the effect of different levels of multifunctional monomer. The half height and wax loss results are shown in Table 2.

BDDA: butane diol diacrylate
MAA: methacrylic acid
MMA: methyl methacrylate

TABLE 2

| Sample Number | % Wall | Wall Composition BDDA:MAA:MMA | Half Height C | Wax Loss % |
|---|---|---|---|---|
| 13 | 10 | 0.5:44.75:54.75 | 334 | |
| 14 | 10 | 1:44.5:54.5 | 342 | |
| 15 | 30 | 1:44.5:54.5 | 337 | |
| 16 | 10 | 2:44:54 | 330 | |
| 17 | 30 | 2:44.1:53.9 | 336 | |
| 18 | 10 | 2.5:43.75:53.75 | 340 | 92 |
| 19 | 10 | 5:42.4:52.5 | 354 | |
| 20 | 10 | 10:45:45 | 380 | |
| 21 | 12.5 | 10:45:45 | 381 | |
| 22 | 15 | 10:45:45 | 364 | |
| 23 | 20 | 10:45:45 | 352 | |
| 24 | 10 | 20:45:35 | 377 | |
| 25 | 10 | 30:45:25 | 403 | |
| 26 | 10 | 40:45:15 | 408 | 28 |
| 27 | 12.5 | 40:45:15 | 364 | 1 |
| 28 | 15 | 40:45:15 | 384 | |
| 29 | 20 | 40:45:15 | 382 | 0 |
| 30 | 10 | 50:45:5 | 378 | 29 |
| 31 | 10 | 75:25:0 | 389 | 17 |
| 32 | 10 | 100:0:0 | 279 | |

This shows that a minimum of 5% multifunctional monomer in the monomer blend is required to attain strong capsules.

EXAMPLE 5

Example 2 was repeated but varying the monomer blend to demonstrate the effect of varying the levels of multifunctional monomer and other monomer in the absence of water-soluble monomer. The half height results are shown in Table 3.

TABLE 3

| Sample number | Wall Composition BDDA:MMA | % Wall | Half Height C | Wax Loss % |
|---|---|---|---|---|
| 33 | 0:100 | 12.5 | 224 | |
| 34 | 25:75 | 12.5 | 307 | |
| 35 | 50:50 | 12.5 | 306 | |
| 36 | 75:25 | 12.5 | 292 | |
| 37 | 100:0 | 12.5 | 280 | |

BDDA: butane diol diacrylate
MMA: methyl methacrylate

This shows that irrespective of level of multifunctional monomer, strong capsules cannot be obtained in the absence of water-soluble monomer.

EXAMPLE 6

Example 2 was repeated but varying the monomer blend to demonstrate the effect of using different water-soluble monomers. The half height and wax loss results are shown in Table 4.

TABLE 4

| Sample number | Wall Composition | % Wall | Half Height |
|---|---|---|---|
| 38 | 40:45:15, BDDA:IA:MMA | 12.5 | 347 |
| 39 | 55:45, BDDA:tBAEMA | 12.5 | 359 |
| 40 | 40:45:15, BDDA:tBAEMA:MMA | 12.5 | 347 |
| 41 | 80:20, BDDA:DMAEMAqMeCl | 12.5 | 355 |

BDDA: butane diol diacrylate
MMA: methyl methacrylate

It is considered that a very important requirement in the wall composition is that the polymer contains not only a relatively high level of multifunctional monomer, but also a water-soluble monomer such as acrylic acid (AA), methacrylic acid (MAA), itaconic acid (IA), t-butylamino ethyl methacrylate (tBAEMA), and dimethylaminoethyl methacrylate, methyl chloride quaternary ammonium salt (DMAEMAqMeCl).

The invention claimed is:
1. A composition comprising particles which comprise a core material within a polymeric shell, wherein the core material comprises a hydrophobic substance,
   in which the amount of the polymeric shell forms 8% to 15% of the total weight of the particles,
   wherein the polymeric shell comprises a copolymer formed from a monomer blend which comprises,
   A) 20 to 90% by weight of an ethylenically unsaturated water soluble monomer which water soluble monomer is anionic or cationic,
   B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
   C) 10 to 50% by weight other monomer,
   and wherein the amount of the polymeric shell and the proportions of A, B and C are such that the particles exhibit a half height of at least 350° C.
2. A composition according to claim 1 in which the polymeric shell forms between 10 and 15% of the total weight of the particles.

3. A composition according to claim 1 in which component A is an anionic monomer in the form of the free acid or water soluble salts thereof.

4. A composition according to claim 1 in which component A is a cationic monomer in the form of acid salts or quaternary ammonium salts.

5. A composition according to claim 1 in which component B is in an alkane diol diacrylate.

6. A composition according to claim 1 in which component C is selected from the group consisting of $C_{1-30}$ alkyl esters of ethylenically unsaturated carboxylic acid, styrene, vinyl acetate, acrylonitrile, vinyl chloride and vinylidene chloride.

7. A composition according to claim 1 wherein the polymeric shell comprises a copolymer formed from a monomer blend which comprises, 10 to 75% by weight of component A and 10 to 75% by weight of component B.

8. A composition according to claim 1 wherein the polymeric shell comprises a copolymer formed from a monomer blend in which comprises 10 to 75% by weight of methacrylic acid, 10 to 75% by weight of 1,4-butane diol diacrylate, and 10 to 50% by weight of methyl methacrylate.

9. A composition according to claim 1 in which the core comprises at least 90% by weight of the hydrophobic substance.

10. A composition according to claim 1 in which the hydrophobic substance is a non-polymeric material.

11. A composition according to claim 1 in which the hydrophobic substance is an oil or wax that has a melting point at a temperature between −30° C. and 150° C.

12. A composition according to claim 1 in which the core material comprises an active ingredient selected from the group consisting of UV absorbers, UV reflectors, flame retardants, active dye tracer materials, pigments, dyes, colorants, scale inhibitors, corrosion inhibitors, antioxidants, pour point depressants, wax deposition inhibitors, dispersants, biocides, enzymes, detergent builders, fragrances, phase change materials and silicone oils.

13. A process of manufacturing a composition comprising particles, which comprises core material within a polymeric shell, wherein the core material comprises a hydrophobic substance, comprising the steps,
1) forming a solution of monomer in a hydrophobic liquid,
2) homogenizing the monomer solution into an aqueous phase to form an emulsion,
3) subjecting the emulsion to polymerization conditions, and
4) forming a dispersion of polymeric particles in the aqueous phase, in which the amount of the polymeric shell forms 8% to 15% of the total weight of the particles,
wherein the polymeric shell comprises a copolymer formed from a monomer blend which comprises,
A) 20 to 90% by weight of an ethylenically unsaturated water soluble monomer which water soluble monomer is anionic or cationic,
B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
C) 10 to 55% by weight other monomer, and wherein the amount of the polymeric shell and the proportions of A, B and C are such that the particles exhibit a half height of at least 350° C.

14. A process according to claim 13, in which the polymeric shell forms between 10 and 15% of the total weight of the particles.

15. A process according to claim 13 in which the monomer is subjected to free radical polymerization.

16. A process according to claim 13 in which a thermal initiator is combined with the monomer and the emulsion is heated to a temperature of at least 50° C. for sufficient time to effect polymerization.

17. A process according to claim 16 in which the emulsion is maintained at a temperature of between 50 and 80° C. for a period of between 90 and 150 minutes and then subjected to a temperature of at least 80° C. for a period of at least 30 minutes.

18. An article comprising a particulate composition comprising a core material within a polymeric shell, in which the core material comprises a hydrophobic substance,
in which the amount of the polymeric shell forms 8% to 15% of the total weight of the particles,
wherein the polymeric shell comprises a copolymer formed from a monomer blend which comprises,
A) 20 to 90% by weight of an ethylenically unsaturated water soluble monomer which water soluble monomer is anionic or cationic,
B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
C) 10 to 50% by weight other monomer,
and wherein the amount of the polymeric shell and the proportions of A, B and C are such that the particles exhibit a half height of at least 350° C.

19. An article according to claim 18, in which the polymeric shell forms between 10 and 15% of the total weight of the particles.

20. An article according to claim 18, which is a textile product or a paper or board packaging material or a shaped mineral article.

21. A coating composition comprising a particulate composition which comprises a core material within a polymeric shell, wherein the core material comprises a hydrophobic substance,
in which the amount of the polymeric shell forms 8% to 15% of the total weight of the particles,
wherein the polymeric shell comprises a copolymer formed from a monomer blend which comprises,
A) 20 to 90% by weight of an ethylenically unsaturated water soluble monomer which water soluble monomer is anionic or cationic,
B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
C) 10 to 50% by weight other monomer,
and wherein the amount of the polymeric shell and the proportions of A, B and C are such that the particles exhibit a half height of at least 350° C.

22. A coating composition according to claim 21, in which the polymeric shell forms between 10 and 15% of the total weight of the particles.

23. A composition according to claim 21 which is a textile coating composition.

24. A composition according to claim 23 which is a polyurethane or polyacrylic textile coating composition.

25. A process of coating a fabric comprising the steps of
i) providing a textile coating composition,
ii) applying the coating composition to a surface of the fabric, and
iii) drying the coating to provide a coated fabric,
in which the coating composition comprises a particulate composition which comprises a core material within a polymeric shell, wherein the core material comprises a hydrophobic substance,
   in which the amount of the polymeric shell forms 8% to 15% of the total weight of the particles,
   wherein the polymeric shell comprises a copolymer formed from a monomer blend which comprises,
   A) 20 to 90% by weight of an ethylenically unsaturated water soluble monomer which water soluble monomer is anionic or cationic,
   B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
   C) 10 to 50% by weight other monomer,
   and wherein the amount of the polymeric shell and the proportions of A, B and C are such that the particles exhibit a half height of at least 350° C.

26. A process according to claim 25, in which the polymeric shell forms between 10 and 15% of the total weight of the particles.

27. A coated fabric comprising a fabric having a coating applied to at least one of the surfaces, wherein coating comprises a particulate composition which comprises a core material within a polymeric shell, wherein the core material comprises a hydrophobic substance,
   in which the amount of the polymeric shell forms 8% to 15% of the total weight of the particles,
   wherein the polymeric shell comprises a copolymer formed from a monomer blend which comprises,
   A) 20 to 90% by weight of an ethylenically unsaturated water soluble monomer which water soluble monomer is anionic or cationic,
   B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
   C) 10 to 50% by weight other monomer,
   and wherein the amount of the polymeric shell and the proportions of A, B and C are such that the particles exhibit a half height of at least 350° C.

28. A coated fabric according to claim 27, in which the polymeric shell forms between 10 and 15% of the total weight of the particles.

29. A fibre containing particles comprising a core material within a polymeric shell, wherein the core material comprises a hydrophobic substance,
   in which the amount of the polymeric shell forms 8% to 15% of the total weight of the particles,
   wherein the polymeric shell comprises a copolymer formed from a monomer blend which comprises,
   A) 20 to 90% by weight of an ethylenically unsaturated water soluble monomer which water soluble monomer is anionic or cationic,
   B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
   C) 10 to 50% by weight other monomer,
   and wherein the amount of the polymeric shell and the proportions of A, B and C are such that the particles exhibit a half height of at least 350° C.

30. A fibre according to claim 29, in which the polymeric shell forms between 10 and 15% of the total weight of the particles.

31. A process of forming a fibre containing particles comprising a core material within a polymeric shell in which the core material comprises a hydrophobic substance comprising the steps of,
   1) combining said particles with a liquid spinning dope,
   2) extruding the spinning dope,
   3) passing extruded dope through an atmosphere at a temperature of at least 150° C. and
   4) collecting formed fibres,
   in which the amount of the polymeric shell forms 8% to 15% of the total weight of the particles,
   wherein the polymeric shell comprises a copolymer formed from a monomer blend which comprises,
   A) 20 to 90% by weight of an ethylenically unsaturated water soluble monomer which water soluble monomer is anionic or cationic,
   B) 5 to 90% by weight of a multifunctional monomer, wherein the multifunctional monomer is ethoxylated bisphenol A diacrylate, propoxylated neopentyl glycol diacrylate, tris(2-hydroxyethyl) isocyanurate triacrylate, trimethylolpropane triacrylate, 1,3-butylene glycol diacrylate, 1,6-hexanediol diacrylate, or 1,4-butanediol diacrylate, and
   C) 10 to 50% by weight other monomer, and wherein the amount of the polymeric shell and the proportions of A, B and C are such that the particles exhibit a half height of at least 350° C.

32. A process according to claim 31, in which the polymeric shell forms between 10 and 15% of the total weight of the particles.

33. The composition according to claim 1, wherein component A) is 20 to 70% by weight.

34. The composition according to claim 1, wherein (i) component A is an anionic monomer in the form of the free acid or water soluble salts thereof or component A is a cationic monomer in the form of acid salts or quaternary ammonium salts, (ii) component B is in an alkane diol diacrylate, and (iii) component C is selected from the group consisting of $C_{1-30}$ alkyl esters of ethylenically unsaturated carboxylic acid, styrene, vinyl acetate, acrylonitrile, vinyl chloride and vinylidene chloride.

* * * * *